United States Patent [19]
Miura

[11] Patent Number: 5,555,468
[45] Date of Patent: Sep. 10, 1996

[54] FINDER DEVICE FOR A CAMERA

[75] Inventor: Kosho Miura, Kanagawa-ken, Japan

[73] Assignee: Nikon Corporation, Tokyo, Japan

[21] Appl. No.: 393,835

[22] Filed: Feb. 24, 1995

[30] Foreign Application Priority Data

May 16, 1994 [JP] Japan ..................... 6-100378

[51] Int. Cl.$^6$ ................................. G03B 13/08
[52] U.S. Cl. ................................................ 354/225
[58] Field of Search ........................... 354/219, 225, 354/152, 155

[56] References Cited

U.S. PATENT DOCUMENTS

| | | | |
|---|---|---|---|
| 4,206,991 | 6/1980 | Kobori et al. | 354/225 |
| 4,289,392 | 9/1981 | Kobori et al. | 354/225 |
| 4,926,208 | 5/1990 | Teramoto et al. | 354/225 |
| 4,974,014 | 11/1990 | Teramoto et al. | 354/225 |

FOREIGN PATENT DOCUMENTS 54-40634  3/1979  Japan.

*Primary Examiner*—David M. Gray
*Attorney, Agent, or Firm*—Oliff & Berridge

[57] ABSTRACT

A finder device using a pentagonal mirror is constructed so that it does not experience clouding, condensation, or oxidation. The finder device (1) comprises a first reflection component (4) having at least two reflective surfaces (6a and 6b) which intersect at substantially right angles. The surfaces reflect the light which passes through at least one of the focus plate (2) and the condenser lens (3) of a camera. A second reflection component (8) reflects the light rays reflected to it by the first reflection component (4) to an eyepiece optical system (11). The space formed between the first and second reflection components (4 and 8) and either the condenser lens (3) or the focus plate (2) or both is filled with an inactive gas. This inactive gas helps prevent clouding, condensation, or oxidation.

20 Claims, 2 Drawing Sheets

FINDER DEVICE FOR A CAMERA

BACKGROUND OF THE INVENTION

1. Field of the Invention

The present invention relates to a finder device for a camera. More particularly, it relates to a finder device for a camera finder that uses a pentagonal mirror.

2. Description of Related Art

Camera finder devices are known which use pentagonal prisms and which use pentagonal mirrors. Devices that use pentagonal mirrors have an advantage over devices that use pentagonal prisms in that the pentagonal mirror devices can be made smaller and lighter than the pentagonal prism devices.

As described in Japanese Laid-Open Application 54-40634, finder devices that use pentagonal mirrors have first and second reflection surfaces. The finder device of the above Japanese application comprises a first reflection mirror that reflects the light rays that have passed through a condenser lens. A second reflection mirror then reflects the light rays that pass from the first reflection mirror to an eyepiece lens system. Finder devices that use pentagonal mirrors have empty spaces that are defined by the area between the first and second reflection mirrors, the condenser lens, and eyepiece lens system.

However, when empty spaces exist in a finder device, the following problems arise.

First, cloudiness can occur during the manufacture of the finder device inside the finder device, since the outside ambient air is enclosed in the finder device.

In particular, when a camera equipped with a finder device with empty spaces is taken from a low temperature environment to a room temperature environment (or, even more markedly, a high temperature environment), condensation can form on the interior of the finder device. Thus, the subject is unclear and cannot be readily seen using the finder device.

Second, since reflection mirrors are used, the reflective surfaces can oxidize or can accumulate dust due to contact with the outside ambient air. This also results in an unclear image.

SUMMARY OF THE INVENTION

It is an object of the present invention to provide a finder device which overcomes the above noted problems associated with finder devices. It is another object of the present invention to provide a finder device in which cloudiness and condensation do not occur. It is a further object of the present invention to provide a finder device which includes a non-oxidizing pentagonal mirror.

In order to accomplish these objects, the present invention fills the empty spaces defined by the area between the first and second reflective components, the eyepiece optical system, and either the condenser lens or focus plate with a predetermined inactive gas. This insures that cloudiness and/or condensation do not occur in the finder device. In addition, the gas insures that the first and second reflection components do not oxidize.

The finder device of the present invention fills the finder device by introducing a gas into the empty spaces by a gas introduction means. The gas introduction means comprises an evacuation component or port and an introduction component or port for introducing the prescribed gas into the empty spaces. Further, the gas introduction means is attached to a holding component. The holding component permits the finder device to fill the empty spaces with a gas efficiently and quickly.

The finder device of the present invention, as discussed hereinafter, can also prevent cloudiness or condensation by filling the empty spaces with dehydrated air. This dehydrated air also helps prevent oxidation on the first and second reflection surfaces.

DETAILED DESCRIPTION OF PREFERRED EMBODIMENTS

Figure 1:
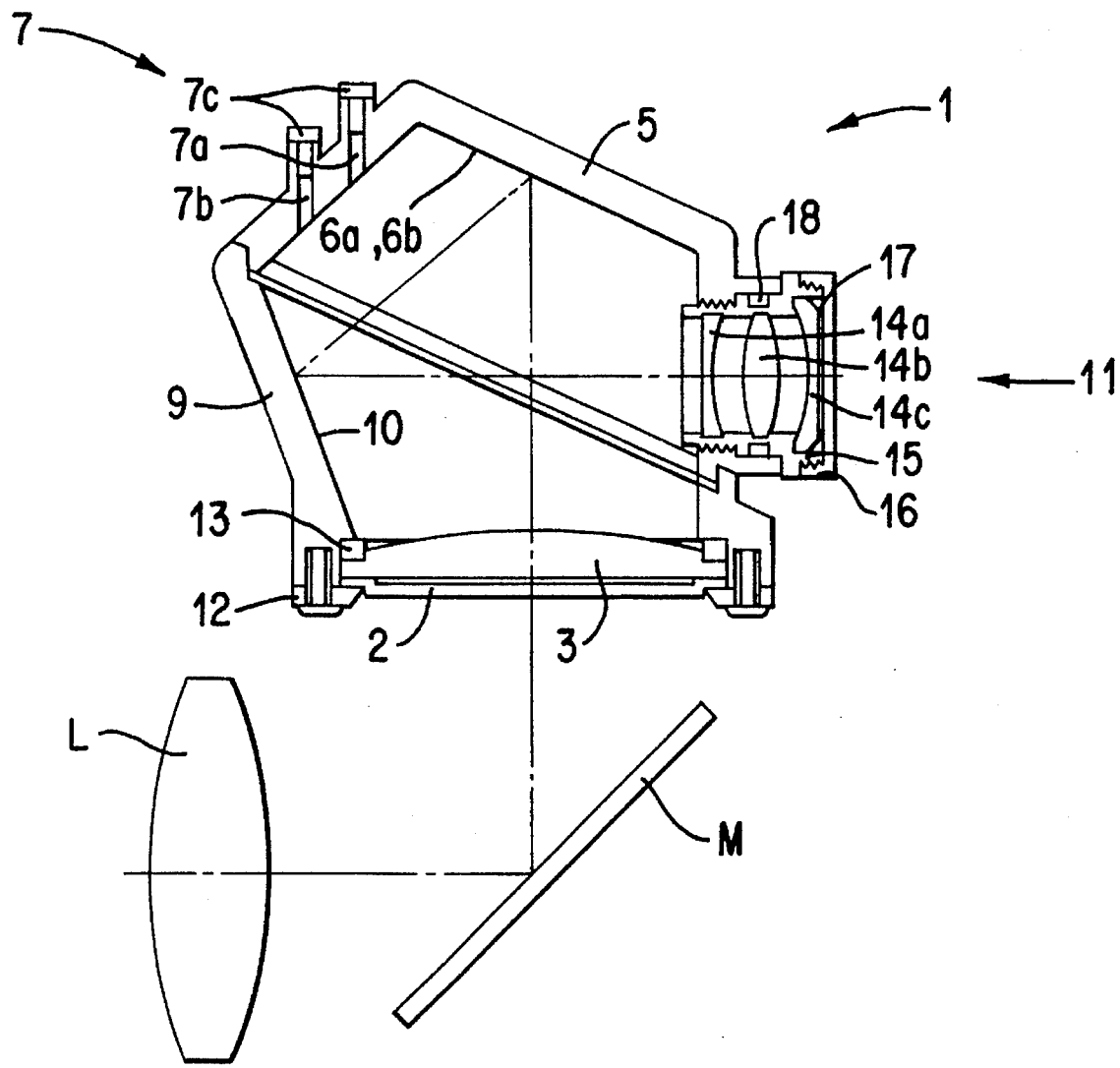
FIG. 1 is a schematic drawing illustrating a finder device according to an embodiment of the present invention including a component of an optical system that guides light rays to the finder device.
Figure 2:
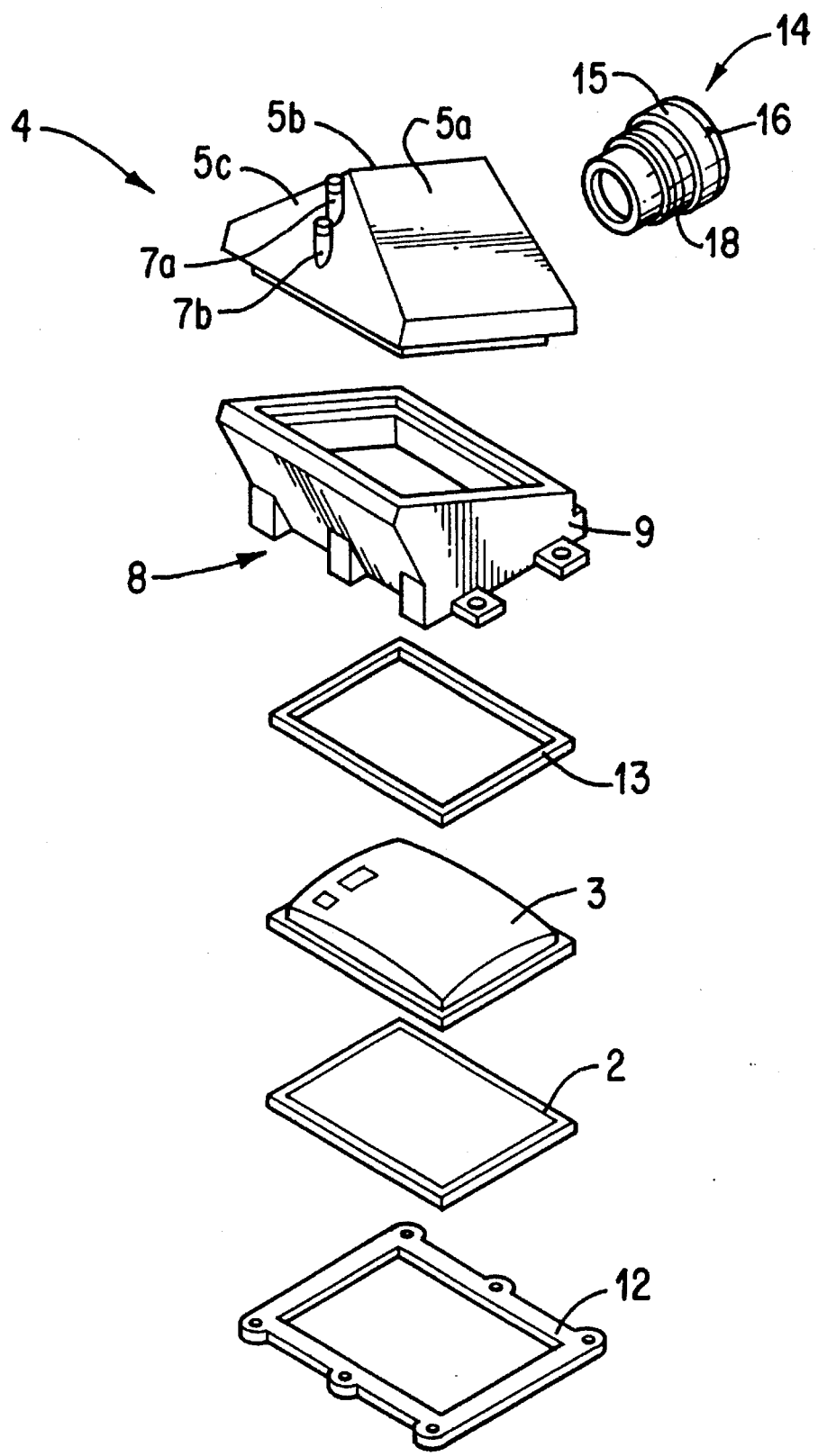
FIG. 2 is a disassembled view illustrating the finder device of FIG. 1.

An embodiment of the present invention is described hereafter, with reference to FIGS. 1 and 2.

FIG. 1 is a schematic drawing illustrating a finder device according to one embodiment of the present invention. The figure also illustrates components of an optical system which guide light rays to the finder device 1. In FIG. 1, the components of the optical system that guide light rays to the finder device 1 include an image composing lens L and a mirror M, which is shown slanted at an angle of 45 degrees.

The finder device includes a focus plate 2 positioned at the point where the image is composed by the image composing lens L. Light rays shine through the image composing lens L and form the image on the focus plate 2.

The condenser lens 3 guides the light rays formed the image on the image plate 2 to a first pentagonal mirror component 4 (see FIG. 2). The focus plate 2 and the condenser lens 3 are affixed to a second pentagonal mirror component 8, as described hereafter.

As shown in FIGS. 1 and 2, the first pentagonal mirror component 4 comprises a plastic frame 5, a first pentagonal mirror 6, and a gas introduction means 7.

The plastic frame 5 (also known as a holding component) has the shape of a pitched roof. It has a first surface 5a and a second surface 5b that intersect at substantially a right angle. The gas introduction means 7 (described in detail hereafter) is attached to a fixed surface 5c of the plastic frame 5.

The first pentagonal mirror 6 comprises two reflection surfaces 6a and 6b. Reflection surface 6a is vapor deposited to the inside of the first surface 5a of the plastic frame 5. Reflection surface 6b, is also vapor deposited to the inside of the second surface 5b of the plastic frame.

After the light rays pass through image composing lens L and are reflected by the mirror M, they enter the finder device. The light rays then pass through the condenser lens 3 and are then reflected by the reflection surface 6a to the reflector surface 6b. The rays are next reflected by the reflection surface 6b to shine on a second pentagonal mirror 10, described hereafter.

The gas introduction means 7 comprises an evacuation component or port 7a, a gas introduction component or port 7b, and removable airtight plugs or closures 7c. The gas introduction means is provided on a surface 5c of the frame 5.

A second pentagonal mirror component 8 comprises a plastic frame 9 and a second pentagonal mirror 10. The second pentagonal mirror 10 is formed by vapor deposition similar to surfaces 6a and 6b. The second pentagonal mirror 10 reflects the light from the reflection surface 6b. The second pentagonal mirror 10 reflects the light to an eyepiece optical system 11.

In the embodiment shown in FIG. 1, the second pentagonal mirror component 8 holds the focus plate 2 and the condenser lens 3. A frame 12 holds the focus plate 2 and the condenser lens 3 to a mating portion of the second pentagonal mirror component 8. The focus plate 2 and the condenser lens 3 are sealed airtight to each other by a packing or gasket 13. A fastener or plurality of fasteners (not labeled) pass through the frame to hold the focus plate 2 and/or condenser lens 3 in an air tight sealed relation to the second pentagonal mirror component 8.

The first pentagonal mirror component 4 and the second pentagonal mirror component 8 are also sealed airtight to each other by gasket or packing (not shown).

As shown in FIG. 1, the eyepiece optical system 11 is positioned almost directly opposite the pentagonal mirror 10. The eyepiece optical system 11 comprises a lens system 14 and a lens tube 15 that holds the lens system 14, and a retaining ring 16. The lens system 14 comprises three lenses 14a, 14b, and 14c. An O-ring 17 is positioned between lens 14c and the retaining ring 16 sealing the eyepiece optical system 14 and making the system 14 airtight.

An O-ring 18 is also positioned between the lens tube 15 and the first pentagonal mirror component 4. O-ring 18 forms an airtight seal between the lens tube 15 and the first pentagonal mirror component 4.

The operation and filling of a finder device of the present invention is described hereafter.

After the finder device 1 has been assembled, evacuation plugs 7c are removed from the evacuation component or port 7a and gas introduction component or port 7b. A vacuum pump (such as a rotary pump although any suitable pump may be utilized) is connected to the evacuation port 7a of the gas introduction means 7. A source of nitrogen gas or other inactive gas is also connected to the gas introduction port 7b.

First, the empty space in the finder device 1, defined by the area between the first pentagonal mirror component 4, the second pentagonal mirror component 8 (including the condenser lens 3), and the eyepiece optical system 11 is evacuated by the vacuum pump through evacuation port 7a. Next, nitrogen gas, other inactive gas, is then introduced into the evacuated empty space through the gas introduction port 7b.

After the gas has been introduced into the empty space, the plugs 7c are inserted into the respective ports. This forms a nitrogen gas environment in the empty space within the finder device 1. Once the airtight plugs have been inserted, outside air cannot enter the device. Thus, finder device 1 can avoid clouding or condensation. Further, the introduction of the inactive gas inhibits oxidation on the first or second pentagonal mirrors 6 and 10.

According to the above description of the present invention, nitrogen gas is used as the inactive gas. However, other inactive gases, such as helium gas, neon gas, argon gas, xenon gas, or krypton gas may be used. Alternatively, and at lower cost, dehydrated air may be used in place of the inactive gas.

Even if the inactive gas in the empty space of the finder device leaks out with the passage of time or owing to atmospheric pressure changes, the inactive gas atmosphere can easily be re-created in the empty space of the finder device. The inactive gas environment can be recreated by removing the airtight plugs 7c and performing the gas introduction operation as described above.

The finder device 1 of the present embodiment has a condenser lens 3, but it is evident that the present invention also applies to a finder device that does not have a condenser lens 3. In such a case, an airtight sealing component (such as gasket or packing) can be inserted in between the focus plate 2 and the plastic frame 9 of the second pentagonal mirror component 8.

In addition, with the present embodiment, plastic frames 5 and 9 are used on the first pentagonal mirror component 4 and the second pentagonal mirror component 8, but it is evident that aluminum or any other suitable material may also be used for the frames. Furthermore, separate mirrors may be used instead of the vapor deposition used above for the pentagonal mirrors 6 and 10.

As described above, since the empty space defined by the area between the first and second reflection components, the eyepiece optical system, the condenser lens, and either the condenser lens or the focus plate of the finder device is filled with an inactive gas, the finder device does not experience clouding or condensation. In addition, the first and second reflection components do not oxidize due to the inactive gas environment. Thus, the photographer can see a clear subject image using the finder device.

The gas introduced into the empty space of the finder device 1 results in a finder device with improved clarity and operability. The finder device 1 also has a superior serviceability for re-establishing the inactive gas environment due to the gas introduction means.

Furthermore, since it is possible to fill the empty space with dehydrated air, the finder device can economically be prevented from clouding, condensation, and oxidation.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A finder device for a camera, the camera having an eye piece optical system and at least one of a focus plate and a condenser lens, the finder device comprising:

a first reflection component having at least one reflective surface, the at least one reflective surface reflects light rays which pass through at least one of the focus plate and the condenser lens;

a second reflection component that reflects the light rays from the first reflection component to the eye piece optical system; and wherein a space is defined by the area between the first and second reflection components and the at least one condenser lens and focus plate, the space being filled with a gas other than ambient air and sealed.

2. A finder device according to claim 1, including:

a gas introduction means for filling the space with the gas.

3. A finder device according to claim 2, wherein the gas introduction means comprises an evacuation port for evacuating the space and an introduction port for introducing the gas into the space.

4. A finder device according to claim 2, further including a holding component, the first reflection component positioned on the holding component, the gas introduction means being positioned on a surface of the holding component.

5. A finder device for a camera according to claim 3, further including sealing means provided on each of the evacuation port and the introduction port.

6. A finder device according to claim 1, wherein the gas is an inactive gas.

7. A finder device according to claim 6, wherein the inactive gas is a gas selected from the group consisting of helium gas, neon gas, argon gas, xenon gas and krypton gas.

8. A finder device according to claim 1, wherein the gas is dehydrated air.

9. A finder device according to claim 1, further including sealing means at the eye piece optical system and the at least one focus plate and condenser lens for providing an air tight seal for the space.

10. A finder device according to claim 1, wherein the space defines a closed and fixed volume.

11. A frame for a finder device of a camera, the frame comprising:

a plurality of surfaces;

at least one of the plurality of surfaces able to reflect light;

one of the plurality of surfaces having at least one port thereon, the at least one port permitting flow of gas through the frame; and closure means for sealing the at least one port.

12. A frame for a finder device of a camera according to claim 11, wherein the at least one port comprises two ports.

13. A frame for a finder device of a camera according to claim 12, further including closure means for sealing the two ports, the closure means provided on the two ports.

14. A frame for a finder device of a camera according to claim 11, wherein the frame further includes an opening adapted to receive an eye piece optical system.

15. A frame for a finder device of a camera according to claim 14, further including sealing means at the opening adapted to receive the eyepiece optical system for sealing the eyepiece optical system in the opening.

16. A frame for a finder device for a camera according to claim 11 further including a connector surface adapted to be sealingly connected to another frame component of the finder device.

17. A method for filling a finder device of a camera with an inactive gas, the finder device comprising at least one port permitting access to the interior of the finder device, the method comprising the steps:

connecting a source of low pressure to the at least one port;

evacuating the interior of the finder device;

connecting a source of inactive gas to the at least one port; and filling the finder device with the inactive gas.

18. A method for filling a finder device according to claim 17, wherein the at least one port includes two ports, wherein the steps of evacuating and filling includes using different ports for each of the steps of evacuating and filling.

19. A method for filling a finder device of a camera according to claim 17, wherein the step of filling the finder device with an inactive gas includes the step of selecting the inactive gas from the group consisting of helium gas, neon gas, argon gas, xenon gas and krypton gas.

20. A method for filling a finder device of a camera according to claim 17, wherein the step of filling the finder device with an inactive gas includes selecting a dehydrated gas as the inactive gas.

* * * * *